(12) United States Patent
Contractor et al.

(10) Patent No.: US 10,349,663 B2
(45) Date of Patent: Jul. 16, 2019

(54) SYSTEM, APPARATUS AND METHOD FOR CUSTOMIZING AND GENERATING A 3D PRINTED FOOD ITEM

(71) Applicant: BeeHex, Inc., Columbus, OH (US)

(72) Inventors: Anjan Contractor, Cypress, TX (US); Chintan Kanuga, Cupertino, CA (US)

(73) Assignee: BeeHex Inc., Columbus, OH (US)

( * ) Notice: Subject to any disclaimer, the term of this patent is extended or adjusted under 35 U.S.C. 154(b) by 96 days.

(21) Appl. No.: 15/587,306

(22) Filed: May 4, 2017

(65) Prior Publication Data

US 2018/0042245 A1 Feb. 15, 2018

Related U.S. Application Data

(60) Provisional application No. 62/364,862, filed on Jul. 21, 2016.

(51) Int. Cl.
*A21D 13/41* (2017.01)
*A23P 20/20* (2016.01)
(Continued)

(52) U.S. Cl.
CPC ............... *A21D 13/41* (2017.01); *A21D 8/02* (2013.01); *A23P 20/20* (2016.08); *A23P 30/20* (2016.08);
(Continued)

(58) Field of Classification Search
USPC ........................................................ 358/1.15
See application file for complete search history.

(56) References Cited

U.S. PATENT DOCUMENTS 9,552,915 B2 1/2017 Khan et al.
9,649,814 B2 5/2017 Yeh
(Continued)

FOREIGN PATENT DOCUMENTS

CN 103315371 A 9/2013
CN 203841022 U 9/2014
(Continued)

OTHER PUBLICATIONS

3D Printer G-Codes website, [https://3dprinterchat.com/2016/02/3d-printer-g-codes/], last accessed Aug. 30, 2017.
(Continued)

*Primary Examiner* — Ngon B Nguyen
(74) *Attorney, Agent, or Firm* — Rutan & Tucker, LLP

(57) ABSTRACT

A system for three-dimensional (3D) printing edible objects, the system including: a first 3D printer including: a first processor; one or more cartridges for storing ingredients used in printing a 3D printed edible object, a plurality of extruders for extruding the ingredients during printing of the 3D printed edible object and a plurality of relays coupled to the plurality of extruders. A first cartridge stores a first ingredient while a second cartridge stores a second ingredient that may be different from the first ingredient. A first extruder extrudes the first ingredient and a second extruder extrudes the second ingredient in a synchronized motion. A first subset of the plurality of relays is configured to control the first extruder and a second subset of the plurality of relays is configured to control the second extruder.

18 Claims, 6 Drawing Sheets

(51) Int. Cl.
  B33Y 10/00 (2015.01)
  B33Y 30/00 (2015.01)
  B33Y 80/00 (2015.01)
  B33Y 50/02 (2015.01)
  B33Y 70/00 (2015.01)
  A21D 8/02 (2006.01)
  A23P 30/20 (2016.01)
  A23P 20/25 (2016.01)

(52) U.S. Cl.
  CPC ............... B33Y 10/00 (2014.12); B33Y 30/00 (2014.12); B33Y 50/02 (2014.12); B33Y 70/00 (2014.12); B33Y 80/00 (2014.12); *A23P 2020/253* (2016.08)

(56) References Cited

U.S. PATENT DOCUMENTS

| | | |
|---|---|---|
| 2011/0236552 A1 | 9/2011 | Vink |
| 2012/0168985 A1 | 7/2012 | Klaber |
| 2012/0251688 A1* | 10/2012 | Zimmerman .......... A23G 1/206 426/383 |
| 2014/0120195 A1 | 5/2014 | Ploskonka |
| 2014/0154378 A1 | 6/2014 | von Hasseln et al. |
| 2014/0288699 A1 | 9/2014 | Williams et al. |
| 2015/0032241 A1* | 1/2015 | Lee .................... B29C 64/386 700/98 |
| 2015/0145174 A1* | 5/2015 | Comb .................. G03G 15/224 264/464 |
| 2015/0197063 A1 | 7/2015 | Shinar et al. |
| 2015/0253761 A1* | 9/2015 | Nelson .................... G06F 17/50 700/98 |
| 2015/0287123 A1 | 10/2015 | Holman et al. |
| 2016/0000139 A1 | 1/2016 | Mou et al. |
| 2016/0066601 A1 | 3/2016 | Herr et al. |
| 2016/0067740 A1 | 3/2016 | Voris et al. |
| 2016/0067866 A1 | 3/2016 | Sekar et al. |
| 2016/0075089 A1* | 3/2016 | Duro Royo .......... B29C 64/386 264/308 |
| 2016/0082652 A1 | 3/2016 | Snyder et al. |
| 2016/0100621 A1 | 4/2016 | Diaz et al. |
| 2016/0106142 A1 | 4/2016 | Contractor et al. |
| 2016/0135493 A1 | 5/2016 | Kuo et al. |
| 2016/0278427 A1* | 9/2016 | Davila .................... A23P 20/00 |
| 2016/0297149 A1 | 10/2016 | Albert et al. |
| 2016/0303801 A1 | 10/2016 | Chang et al. |
| 2016/0330992 A1 | 11/2016 | Von Hasseln et al. |
| 2016/0338545 A1 | 11/2016 | Shah et al. |
| 2017/0099867 A1 | 4/2017 | Corthesy-Malnoe et al. |
| 2017/0109925 A1 | 4/2017 | Gritzky et al. |
| 2017/0120527 A1 | 5/2017 | Miller et al. |
| 2017/0134716 A1 | 5/2017 | Naito |
| 2017/0148348 A1 | 5/2017 | Hardee et al. |
| 2018/0020683 A1 | 1/2018 | Contractor et al. |

FOREIGN PATENT DOCUMENTS

| | | |
|---|---|---|
| CN | 204070482 U | 1/2015 |
| CN | 104365954 A | 2/2015 |
| CN | 103720021 B | 5/2015 |
| CN | 204635061 U | 9/2015 |
| CN | 204653736 U | 9/2015 |
| CN | 204682494 U | 10/2015 |
| CN | 105196553 A | 12/2015 |
| CN | 105394801 A | 3/2016 |
| CN | 205492576 U | 8/2016 |
| CN | 105922582 A | 9/2016 |
| EP | 3162474 A1 | 5/2017 |
| TW | M511764 U | 11/2015 |
| TW | 201700156 A | 1/2017 |
| WO | 2014/190168 A1 | 11/2014 |
| WO | 2015115897 A1 | 8/2015 |
| WO | 2016033842 A1 | 3/2016 |
| WO | 2016150960 A1 | 9/2016 |
| WO | 2016161276 A1 | 10/2016 |
| WO | 2017006330 A1 | 1/2017 |
| WO | 2017039858 A1 | 3/2017 |
| WO | 2017075277 A1 | 5/2017 |
| WO | 2017081040 A1 | 5/2017 |

OTHER PUBLICATIONS

PCT/US2017/043270 filed Jul. 21, 2017 International Search Report and Written Opinion dated Sep. 27, 2017.

U.S. Appl. No. 15/655,865, filed Jul. 20, 2017 Notice of Allowance dated Aug. 28, 2018.

* cited by examiner

SYSTEM, APPARATUS AND METHOD FOR CUSTOMIZING AND GENERATING A 3D PRINTED FOOD ITEM

CROSS-REFERENCE TO RELATED APPLICATIONS

This application claims the benefit of priority to U.S. Provisional Application No. 62/364,862, filed Jul. 21, 2016, the entire contents of which are incorporated by reference herein.

TECHNICAL FIELD

Embodiments of the disclosure relate generally to making pizzas. Embodiments relate more particularly to a system for customizing and making pizzas on a pizza maker and methods thereof.

BACKGROUND

A pizza is a flatbread generally topped with tomato sauce, toppings and cheese, baked in an oven. Today, pizza has become a favorite cuisine among numerous people. However, pizzas have been criticized as having an unhealthy balance of ingredients. Pizzas can be high in salt, fat and food energy.

Typically, pizzas come in a circular shape. Some pizza restaurants offer a limited number (two or three) of pizza sizes. As a result, it becomes almost impossible to configure a pizza to a specific calorie requirement or make a pizza crust of different ingredients.

In light of the above discussion, there appears to be a system and method for customizing and making pizzas on a pizza maker.

Object of Invention

The principal object of the embodiments herein is to provide a system (pizza printer) to enable printing of a pizza crust, sauce, cheese in any shape, size and thickness.

Another object of the embodiments herein is to use a 3D printing technology to automatically create various layers of pizza and with customized requirements.

Another object of the embodiments herein is to provide a method to allow a consumer to communicate with the system and provide customized requirements.

SUMMARY

The above-mentioned needs are met by a system for customizing and making pizzas on a pizza maker.

An example of the computer-implemented method for customizing pizzas on a mobile device and preparing on a pizza maker includes receiving a plurality of inputs from a user by allowing the user to draw, configure and order one or more pizzas through a graphical interface on a mobile device. Further, the computer-implemented method includes sending the inputs wirelessly to a server. Furthermore, the computer-implemented method includes identifying an appropriate 3D food printer and subsequently sending the inputs from the server to the 3D food printer. Moreover, the computer-implemented method includes allowing the 3D food printer to decide a crust, sauce and cheese based on the inputs. The computer-implemented method includes instructing the 3D food printer to form the pizza by printing a plurality of ingredients layer-by-layer thereby providing granularity in shape, size and thickness for the ingredients.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

FIG. 1 block diagram of an environment, according to the embodiments as disclosed herein;

DETAILED DESCRIPTION OF THE EMBODIMENTS

The above-mentioned needs are met by a method and system for customizing pizzas on a mobile device and preparing on a pizza maker. The following detailed description is intended to provide example implementations to one of ordinary skill in the art, and is not intended to limit the invention to the explicit disclosure, as one or ordinary skill in the art will understand that variations can be substituted that are within the scope of the invention as described.

It will be appreciated to those skilled in the art that the method described herein may be used for customizing other types of food.

Further, it will be appreciated to those skilled in the art that the method described herein is functional only with the system (pizza maker) described herein.

Figure 1:
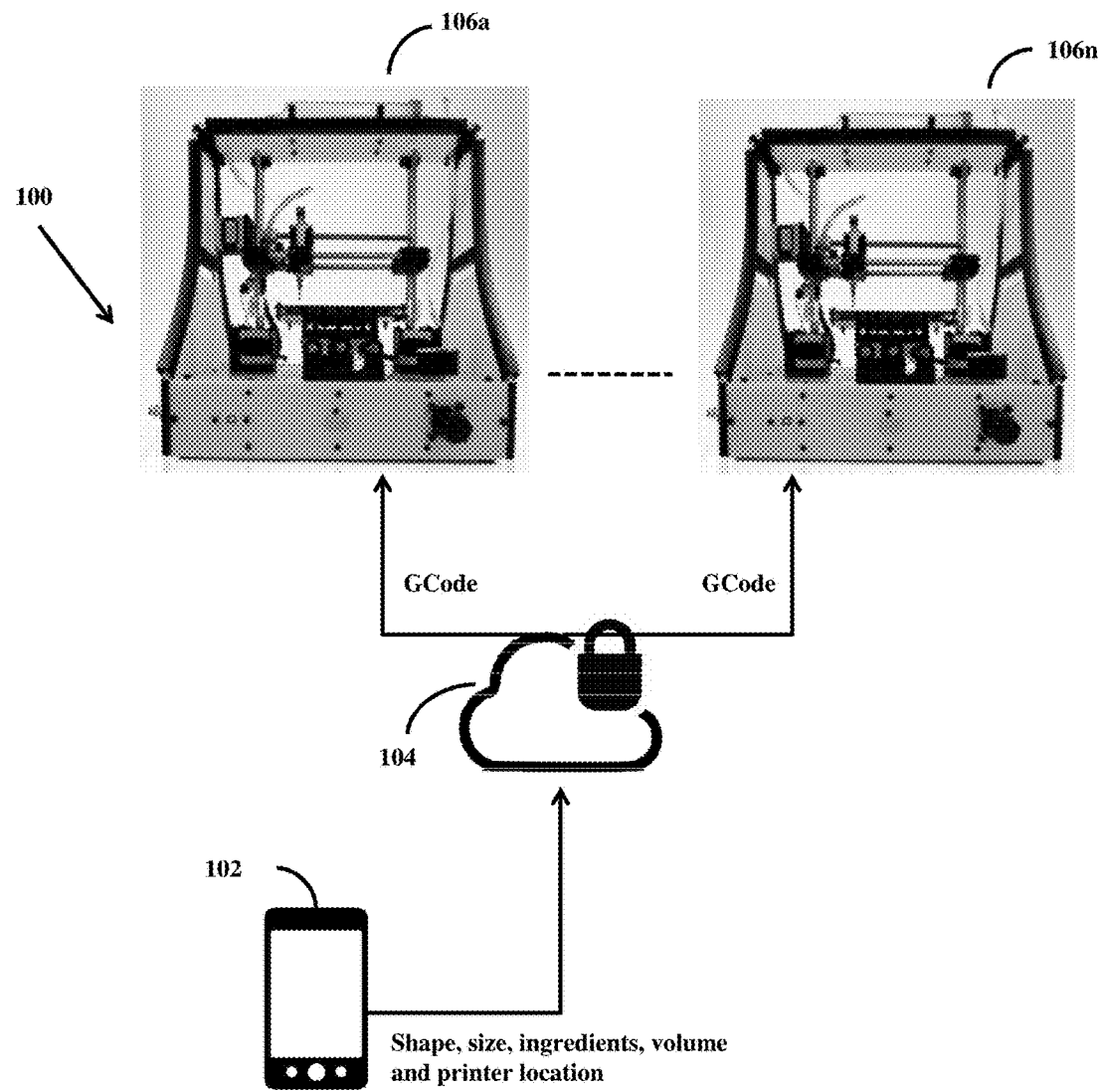

FIG. 1 block diagram of an environment, according to the embodiments as disclosed herein. The environment 100 includes a computing device 102, a server 104 and a plurality of 3D food printers, for example, 3D food printer 106a and 3D food printer 106n.

Examples of the computing device 102 includes, but is not limited to, personal digital assistants, cellular telephones, smart phones, tablets and other similar computing devices. In a specific context, the computing device 102 is a smart phone. Specifically, the computing device 102 is operated by a user (not shown in FIG. 1) who desires to customize a pizza. In some embodiments, the computing device 102 may be operated by a restaurant owner.

A computer program product (herein referred to as a "mobile application") is tangibly embodied in the computing device 102. The computer program product also contain instructions that when executed perform the method described herein. Typically, the mobile application provides a very easy to use and intuitive graphical interface for the users (consumers) to design, configure and order their pizza. Further, the mobile application allows the user to pick a location to prepare the pizza and subsequently picks up the pizza from the appropriate 3D food printer.

The server 104 may also be referred to as a BeeHex server. The server 104 maintains a database (not shown in FIG. 1) of the status of each of the printer like (the printer queue, time it would take till the next order, ingredient levels and so on). Further, the server 104 consolidates all the orders from users and routes it to the appropriate 3D food printer location. The server 104 also stores GCODES that are sent to the 3D food printers.

The 3D food printers are configured with a 3D printer software that connects to the server 104 and regularly pulls the order received. The 3D food printers are built using a drip-proof extruder system. Additionally, the 3D printer software keeps a track of when the ingredients were loaded into the 3D food printer and the amount consumed and amount left. A local queue of orders is also maintained and sequentially sends each order to the 3D food printer.

Further, the 3D food printers are controlled using the configurations stored in the server 104. The configurations includes critical information required to print a pizza, for instance, shape, ingredients, number of layers of each of the ingredients, thickness of each of the ingredients and so on. The configurations are converted into small code (also referred to as key).

At first, a user selects a specific thickness and width for a pizza. Pointers are then generated that selects and compiles GCODES. Subsequently, a pointer is created that acts as a key to find files on the server. Upon identification of various GCODES, an algorithm stacks up the GCODES and sends them (as a single file) to an appropriate 3D printer. A 3D printer store will put this file in a queue and will then go to the appropriate 3D printer.

The information collected from the users is sent to the server 104. Subsequently, the server 104 identifies the appropriate 3D food printer and sends the information in a protocol that the 3D food printer recognizes. The 3D food printer is identified with its unique ID with the server 104. The server 104 uses this ID to identify an appropriate 3D food printer and subsequently sends pizza configurations and print commands to the identified 3D food printer. In other words, the inputs provided by the user (through the graphical interface) are converted to computer-aided-design (CAD) drawings and G-Code (RS-274) language required for the computer aided manufacturing system (3D food printer).

The 3D food printer then prepares the pizza based on the configurations thereby providing a customized experience to the user. The user may then go to the appropriate location of the 3D food printer and collect his/her customized pizza.

Figure 2:
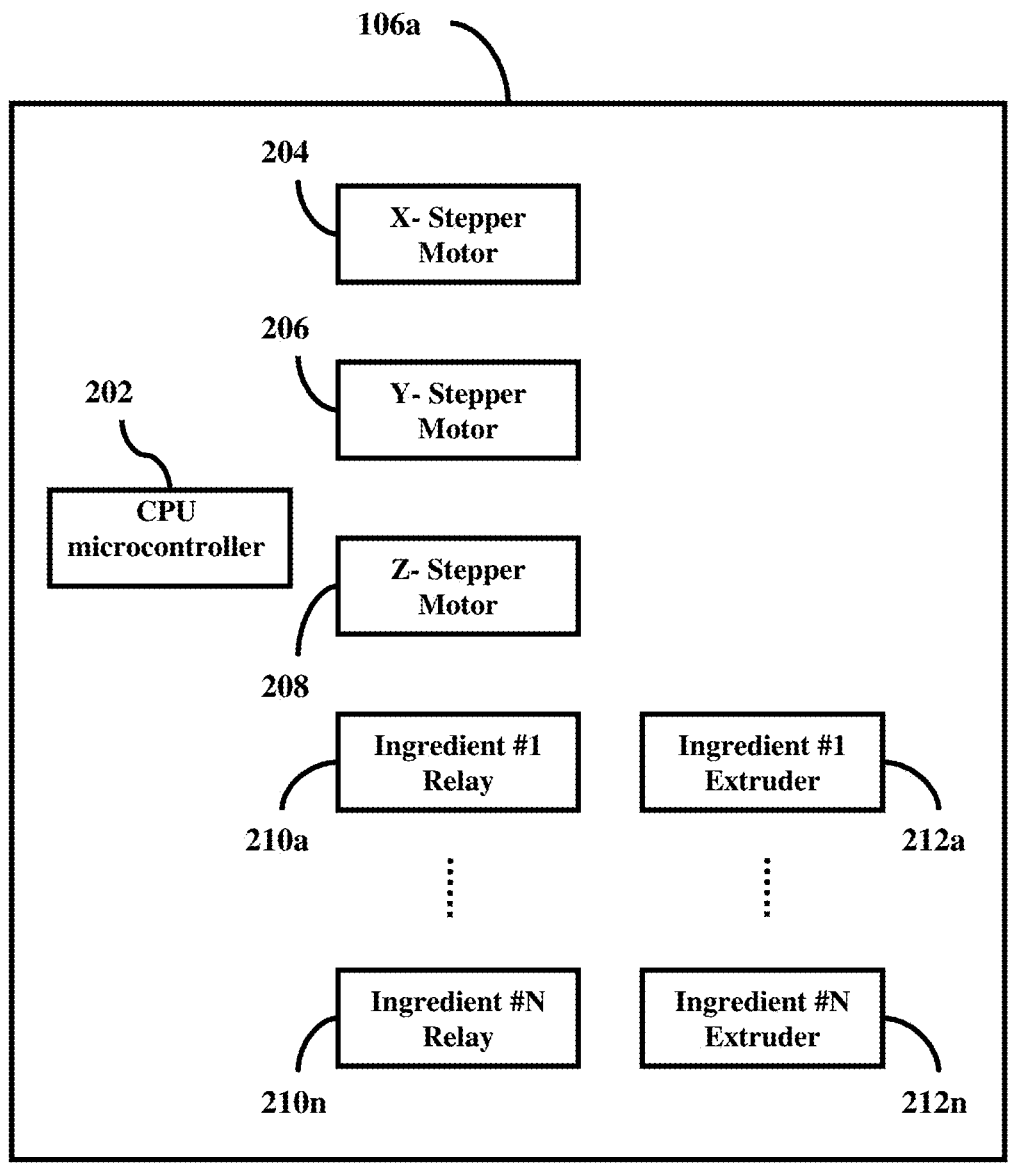
FIG. 2 is a block diagram of a 3D food printer, according to the embodiments as disclosed herein.

FIG. 2 is a block diagram of a 3D food printer, according to the embodiments as disclosed herein. The 3D food printer 106a includes a microcontroller (CPU microcontroller) 202 that controls three stepper motors (X-Stepper Motor 204, Y-Stepper Motor 206 and Z-Stepper Motor 208) and relays (Ingredient #1 relay 210a and Ingredient #2 relay 210n). Typically, there are two relays for each ingredient. For instance, for three ingredients (one dough, one sauce and one cheese), there will be at least six relays. The relays in turn control the extruder (Ingredient #1 Extruder 212a and Ingredient #N Extruder 212n) for the various ingredients. In some embodiments, more than three stepper motors may be used.

The three stepper motors (X-Stepper Motor 204, Y-Stepper Motor 206 and Z-Stepper Motor 208) move over a base plate (not shown in FIG. 2). The X-Stepper Motor 204 controls the base plate. The Y-Stepper Motor 206 controls a top arm. The top arm/assembly (not shown in FIG. 2) holds the tubes (not shown in FIG. 2) with the food ingredients. Further, the Z-Stepper Motor 208 provides the Z-axis movement of the top arm.

Typically, the microcontroller 202 aligns the extruder nozzle (not shown in FIG. 2) and the base plate appropriately to recreate the exact shape. The microcontroller 202 enables and/or disables the relays appropriately so the exact desired amount of ingredients is deposited on the base plate. A synchronized motion of X, Y and Z axis creates the exact shape, size and nutritional characteristics of the pizza thus providing a customized experience to the consumer. The synchronized motion is governed by the GCODE.

The 3D food printer 106a has cartridges for multiple crusts, for instance gluten-free, whole-wheat, regular dough, multiple sauces like marinara and pesto, multiple cheese and so on. Consequently, a pizza is created using the ingredients selected by the user in the mobile application.

The microcontroller receives the GCODE and subsequently decodes the GCODE into exact X, Y and Z location and activates each of the X, Y and Z stepper motor.

Figure 3A:
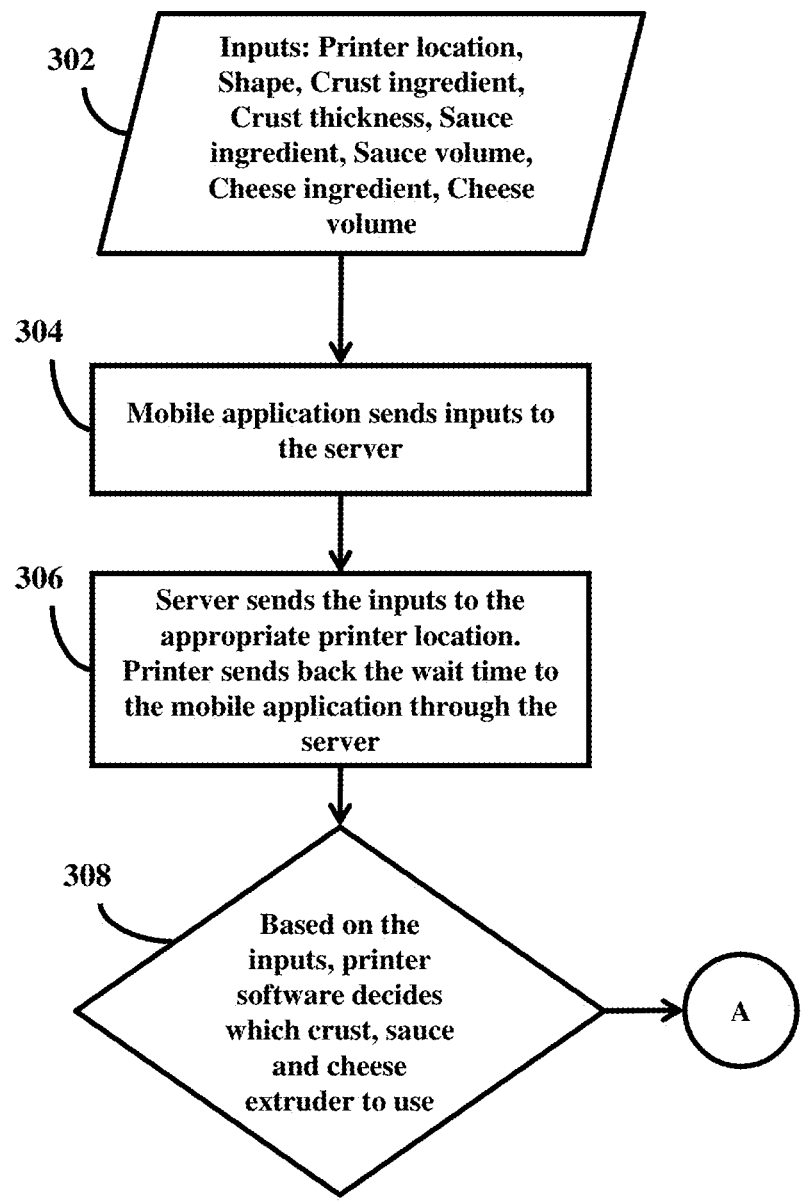
FIG. 3a-FIG. 3c is a flow diagram customizing pizzas on a mobile device and preparing on a pizza maker, according to the embodiments as disclosed herein.
Figure 3B:
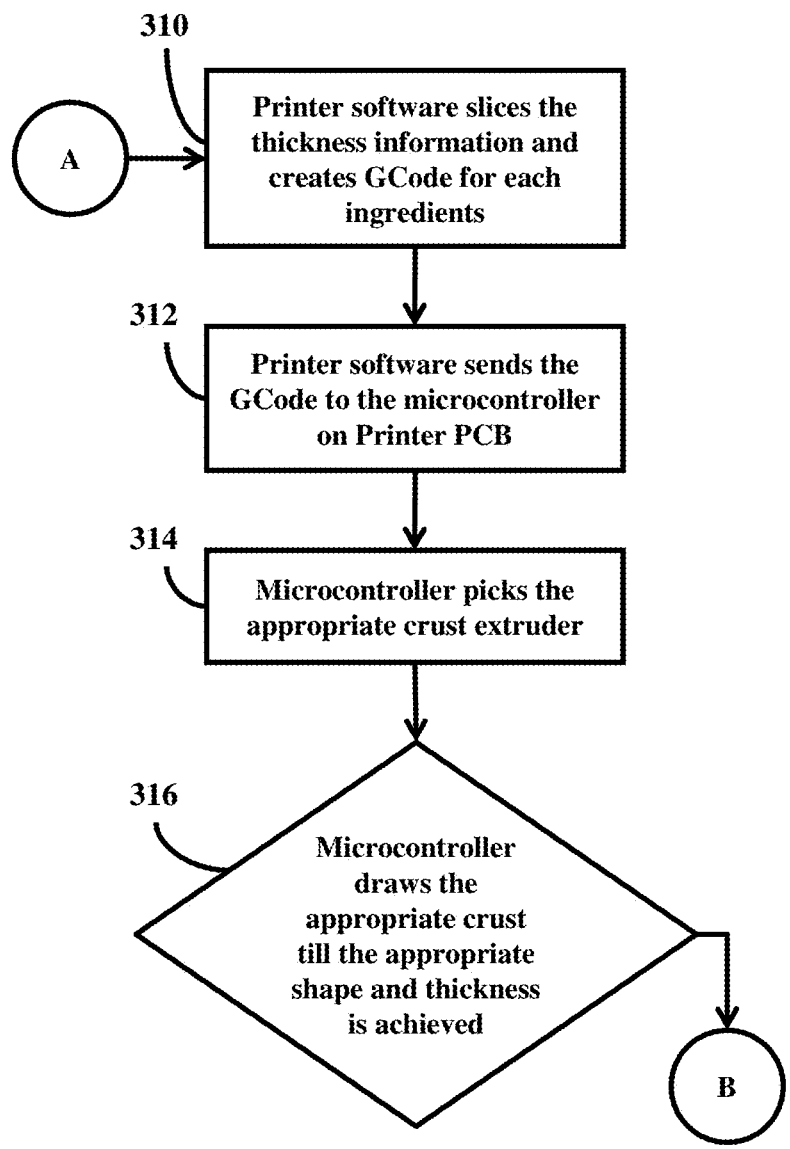
Figure 3C:
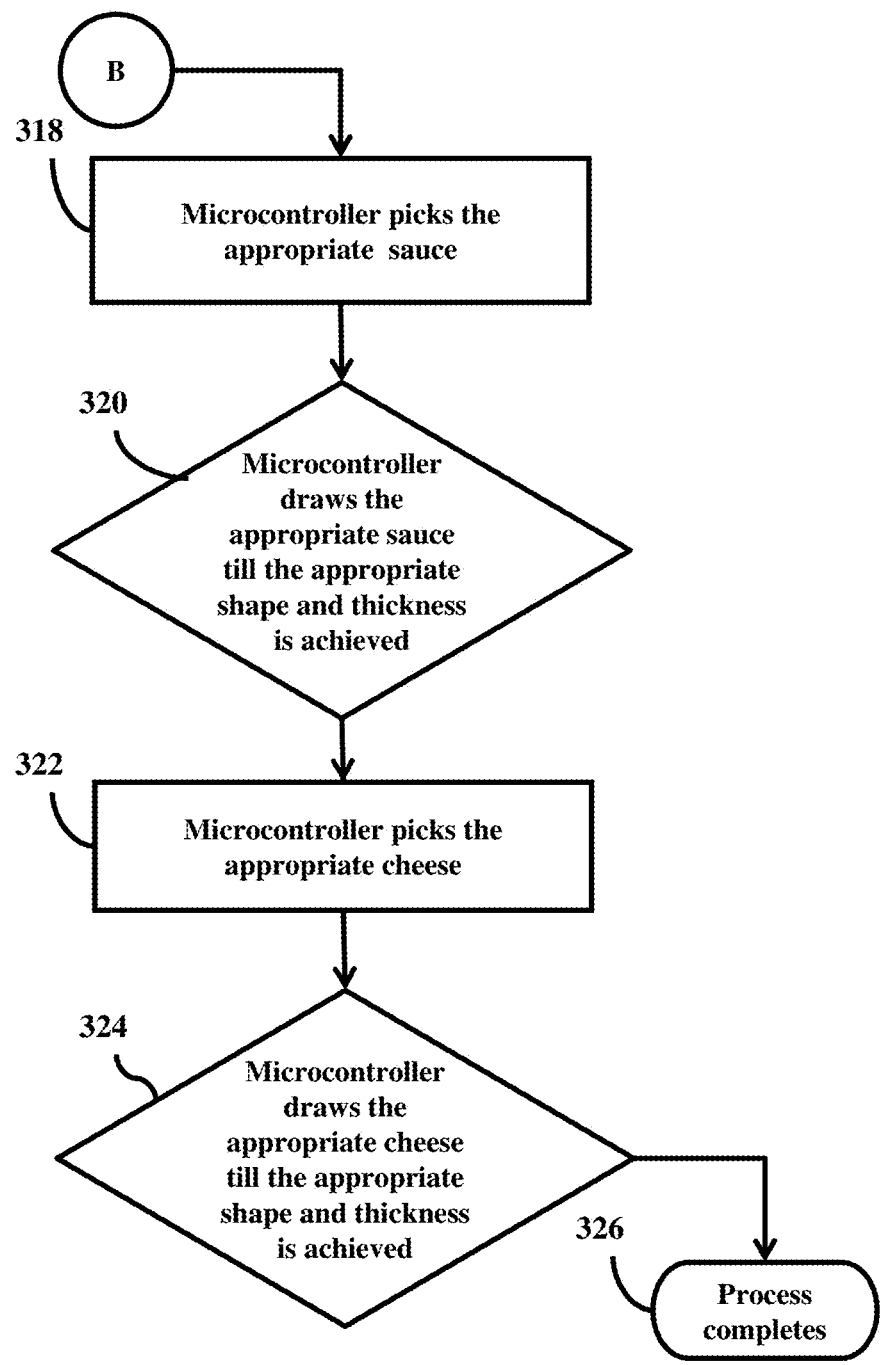

FIG. 3a-FIG. 3c is a flow diagram illustrating a method for customizing pizzas on a mobile device and preparing on a pizza maker, according to the embodiments as disclosed herein. The flow diagram begins at step 302.

At step 302, inputs are received from a user. The inputs include printer location, shape, crust ingredient, crust thickness, sauce ingredient, sauce volume, cheese ingredient and cheese volume.

At step 304, the mobile application configured on the user's computing device sends the inputs to the server.

At step 306, the server sends the inputs to the appropriate printer location. The 3D food printer sends back a wait time to the mobile application through the server.

At step 308, based on the inputs, the 3D printer software decides a crust, sauce and cheese extruder to use.

At step 310, the 3D printer software slices the thickness information and creates GCODE for each ingredient. The sliced 3D CAD Models are also called GCODES which are available on the server. The GCODES have specific file names, for instance "DoughUS1 mmTHK300 mmWIDE.GCODE".

Specifically, when a user selects a specific thickness and width of a pizza, a pointer is generated (for instance, US###). This pointer is used as a key to find files on the server. After identification of various GCODES, an algorithm stacks up the GCODES together in a single file and sends it to a 3D Printer. The 3D Printer store will put this file in a queue and will then go to the printer when its available.

At step 312, the 3D printer software sends the GCODE to the microcontroller on the printer PCB.

At step 314, the microcontroller picks the appropriate crust extruder.

At step 316, the microcontroller draws the appropriate crust till the appropriate shape and thickness is achieved.

At step 318, the microcontroller picks the appropriate sauce.

At step 320, the microcontroller draws the appropriate sauce till the appropriate shape and thickness is achieved.

At step 322, the microcontroller picks the appropriate cheese.

At step 324, the microcontroller draws the appropriate cheese till the appropriate shape and thickness is achieved.

The method described herein can be used at several outlets as listed below:
1. The method can be used in Pizza restaurants to provide a much faster turnaround.
2. The method can be used in unmanned locations like cafeterias, airport lounges etc.
3. The method can be used to provide custom shapes like team mascots at sports stadiums and events.
4. The method can be used to provide custom character shapes at theme parks.

The method described herein is beneficial for several reasons as listed below:
1. Increases cost savings.
2. Consistent and efficient.
3. Provides customizable size, shape and nutritional content.

The flow diagram ends at step 326. The 3D printer software notifies the user.

Figure 4:
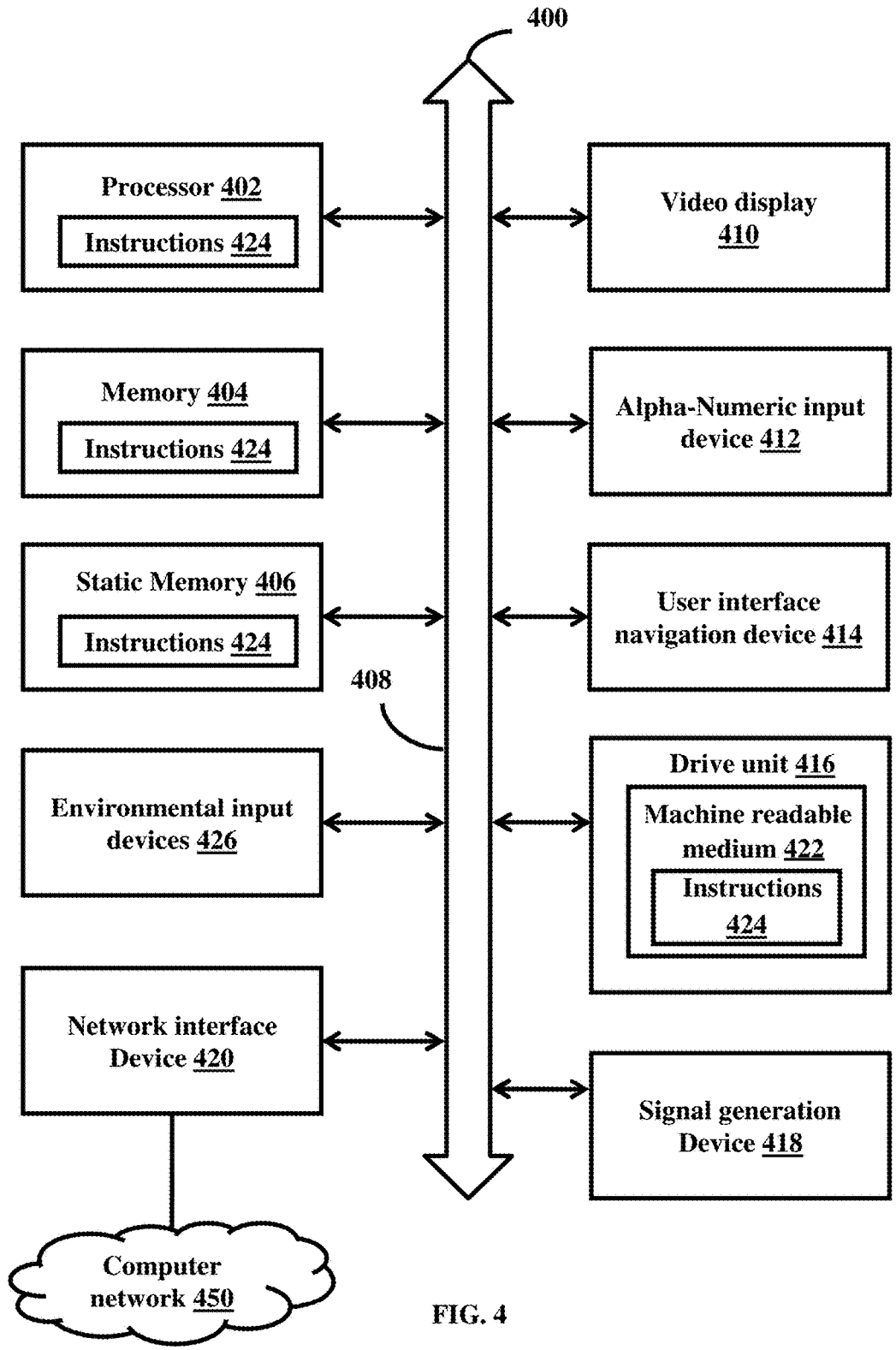
FIG. 4 is a block diagram of a machine in the example form of a computer system 400 within which instructions for causing the machine to perform any one or more of the methodologies discussed herein may be executed.

FIG. 4 is a block diagram of a machine in the example form of a computer system 400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404, and a static memory 406, which communicate with each other via a bus 406. The computer system 406 may further include a video display unit(e.g., a liquid crystal displays (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420. The computer system 400 may also include an environmental input device 426 that may provide a number of inputs describing the environment in which the computer system 400 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media(e.g., a centralized or distributed database, and/or associated caches and servers) that store the one or more instructions 424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 424 may further be transmitted or received over a computer network 450using a transmission medium. The instructions 424 may be transmitted using the network interface device 420 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

What is claimed is:

1. A method of printing a three-dimensional (3D) object, the method comprising:

receiving, by a server, 3D printing inputs including location information;

maintaining, by the server, a database that includes information associated with a status of each of the plurality of 3D printers including at least one of (i) a queue for each of the plurality of 3D printers, (ii) an estimated time until processing of a next order for each of the plurality of 3D printers, or (iii) ingredient levels for each of the plurality of 3D printers;

determining, by the server, a first 3D printer of the identified at least one 3D printer of the plurality of 3D printers based on the location information and the status of each of the identified at least one 3D printer of the plurality of 3D printers; and transmitting, by the server, the 3D printing inputs and instructions to the first 3D printer to print a 3D printed edible object according to the 3D printing inputs.

2. The method of claim 1, wherein the 3D printing inputs include a food type and at least one of a shape of the food type, a length of the food type, a width of the food type, or a thickness of the food type.

3. The method of claim 2, wherein the food type is pizza and the 3D printing inputs further include at least one of a crust type, a sauce type, or a cheese type.

4. The method of claim 1, wherein the 3D printing inputs are received from a mobile device.

5. The method of claim 1, wherein identifying the first 3D printer includes parsing the 3D printing inputs to determine the first 3D printer as selected by a user according to an identifier particular to the first 3D printer.

6. The method of claim 1, further comprising:

identifying, by the server, a plurality of GCODES based on the 3D printing inputs; and generating, by the server, a file from the GCODES including printing instructions specific to the 3D printing inputs.

7. The method of claim 1, wherein the 3D printer includes a drip-proof extruder system.

8. The method of claim 1, further comprising:

extruding, by one or more extruders of the first 3D printer, one or more ingredients corresponding to the 3D printing inputs to print the 3D printed edible object.

9. A system for three-dimensional (3D) printing edible objects, the system including:

a plurality of 3D printers including a first 3D printer wherein the first 3D printer includes:

a first processor, one or more cartridges for storing ingredients used in printing a 3D printed edible object, a plurality of extruders for extruding the ingredients during printing of the 3D printed edible object, and a plurality of relays coupled to the plurality of extruders configured to control the plurality of extruders; and server logic, when executed by a second processor, being configured to perform operations including:

maintain a database that includes information associated with a status of each of the plurality of 3D printers including at least one of (i) a queue for each of the plurality of 3D printers, (ii) an estimated time until processing of a next order for each of the plurality of 3D printers, or (iii) ingredient levels for each of the plurality of 3D printers, selecting the first 3D printer based on location information and the status of each of the plurality of 3D printers, and transmitting 3D printing inputs and instructions to the first 3D printer to print a 3D printed edible object according to the 3D printing inputs.

10. The system of claim 9, wherein the 3D printed edible object is to printed to have a known caloric value according to user input.

11. The system of claim 10, wherein the first 3D printer further comprises:
a first non-transitory, computer-readable storage medium communicatively coupled to the first processor and having first logic stored thereon, the first logic, when executed by the first processor, causes performance of a first set of operations including:
receiving the one or more GCODES from the server logic, and
printing the 3D printed edible object by extruding the ingredients from the plurality of extruders according to the one or more GCODES.

12. The system of claim 9, further comprising:
a server including:
the second processor;
a second non-transitory, computer-readable storage medium communicatively coupled to the second processor and having the server logic stored thereon, the server logic, when executed by the second processor, causes performance of further operations including:
receiving the 3D printing inputs,
identifying the first 3D printer of a plurality of 3D printers based on the 3D printing inputs,
parsing the 3D printing inputs to determine one or more GCODES that correspond to the 3D printing inputs, and
transmitting the instructions including the one or more GCODES to the first 3D printer enabling the first 3D printer to print the 3D printed edible object.

13. The system of claim 12, wherein the server logic, when executed by the second processor, causes performance of the further operations including:
receiving, from the first 3D printer, a wait time associated with printing of the 3D printed edible object.

14. The system of claim 12, wherein the 3D printing inputs include a food type of pizza and at least one of: a shape of the pizza, a length of the pizza, a width of the pizza, a thickness of the pizza, a crust type, a sauce type, or a cheese type.

15. The system of claim 9, wherein the first 3D printer further comprises:
one or more stepper motors; and
a base plate for receiving the 3D printed edible object, wherein the one or more stepper motors further control a position of the base plate.

16. A non-transitory computer-readable medium including instructions stored therein and executable by a processor, the instructions for three-dimensional (3D) printing of a 3D edible object and comprising:
a first component for receiving 3D printing inputs, wherein the 3D printing inputs include (i) location information, (ii) a food type and (iii) at least one of a shape of the food type, a length of the food type, a width of the food type, or a thickness of the food type;
a second component for parsing the 3D printing inputs and generating one or more printing instructions corresponding to the 3D printing inputs;
a third component for compiling a file comprising the one or more printing instructions;
a fourth component for maintaining a database that includes information associated with a status of each of a plurality of 3D printers including at least one of (i) a queue for each of the plurality of 3D printers, (ii) an estimated time until processing of a next order for each of the plurality of 3D printers, or (iii) ingredient levels for each of the plurality of 3D printers;
a fifth component for determining a first 3D printer of the plurality of 3D printers based on the location information and the status of each of the plurality of 3D printers; and
a sixth component for transmitting the file to the first 3D printer for printing of the 3D edible object corresponding to the 3D printing inputs.

17. The non-transitory computer-readable medium of claim 16, wherein the first component receives the 3D printing inputs from an application executed by a network device.

18. The non-transitory computer-readable medium of claim 16, wherein a microcontroller of the first 3D printer instructs performance of extrusion of one or more ingredients by one or more extruders of the first 3D printer, wherein the one or more ingredients are set forth in the 3D printing inputs.

* * * * *